United States Patent [19]
Kling, III et al.

[11] Patent Number: 5,313,711
[45] Date of Patent: May 24, 1994

[54] WHEEL ALIGNMENT SYSTEM

[75] Inventors: Michael J. Kling, III, Mequon; Michael P. Alusick, Hartland; Gary R. Kercheck, Colgate; Jeff C. Krueger, Milwaukee; Duane M. Schmitz, Shorewood; James L. Visser, New Berlin, all of Wis.

[73] Assignee: Bear Automotive Service Equipment Company, New Berlin, Wis.

[21] Appl. No.: 4,779

[22] Filed: Jan. 14, 1993

Related U.S. Application Data

[63] Continuation of Ser. No. 753,896, Aug. 30, 1991, abandoned.

[51] Int. Cl.$^5$ .................... G01B 11/275; G01B 7/315
[52] U.S. Cl. .................... 33/288; 33/203.18; 356/155
[58] Field of Search .............. 33/288, 203–203.21; 356/155; 364/424.05

[56] References Cited

U.S. PATENT DOCUMENTS

| | | | |
|---|---|---|---|
| 4,274,738 | 6/1981 | Hollandsworth et al. | 33/288 |
| 4,381,548 | 4/1983 | Grossman et al. | 33/288 |
| 4,594,789 | 6/1986 | Marino et al. | 33/288 |
| 4,718,759 | 1/1988 | Butler | 33/288 |
| 4,899,218 | 2/1990 | Waldecker et al. | 33/288 |
| 4,904,939 | 2/1990 | Mian | 33/203.11 |

Primary Examiner—William A. Cuchlinski, Jr.
Assistant Examiner—C. W. Fulton
Attorney, Agent, or Firm—Kinney & Lange

[57] ABSTRACT

An automatic wheel alignment system for aligning the wheels of an automotive vehicle includes head units adapted for coupling to the wheels of the automotive vehicle and a hand held module. The wheel units provide angle information related to the alignment of the wheels of the automotive vehicle. The hand held module is coupled to the wheel alignment units and provides information to an operator through a liquid crystal display. The hand held module includes a controller and memory means. A keypad input is provided for receiving an input from the operator. The liquid crystal display includes an liquid crystal display matrix for forming an image. A contrast control means is coupled to the liquid crystal display and provides a contrast signal to the liquid crystal display.

21 Claims, 18 Drawing Sheets

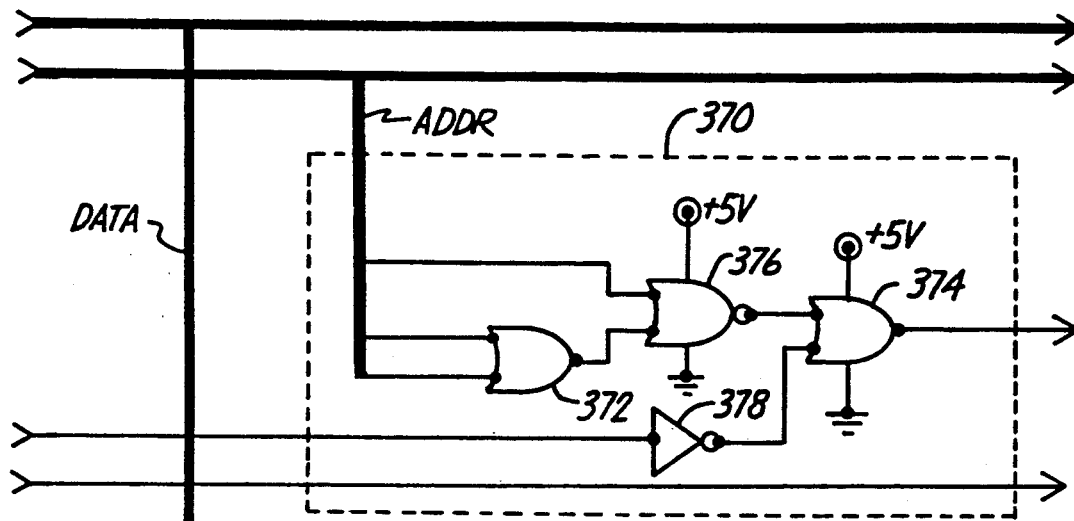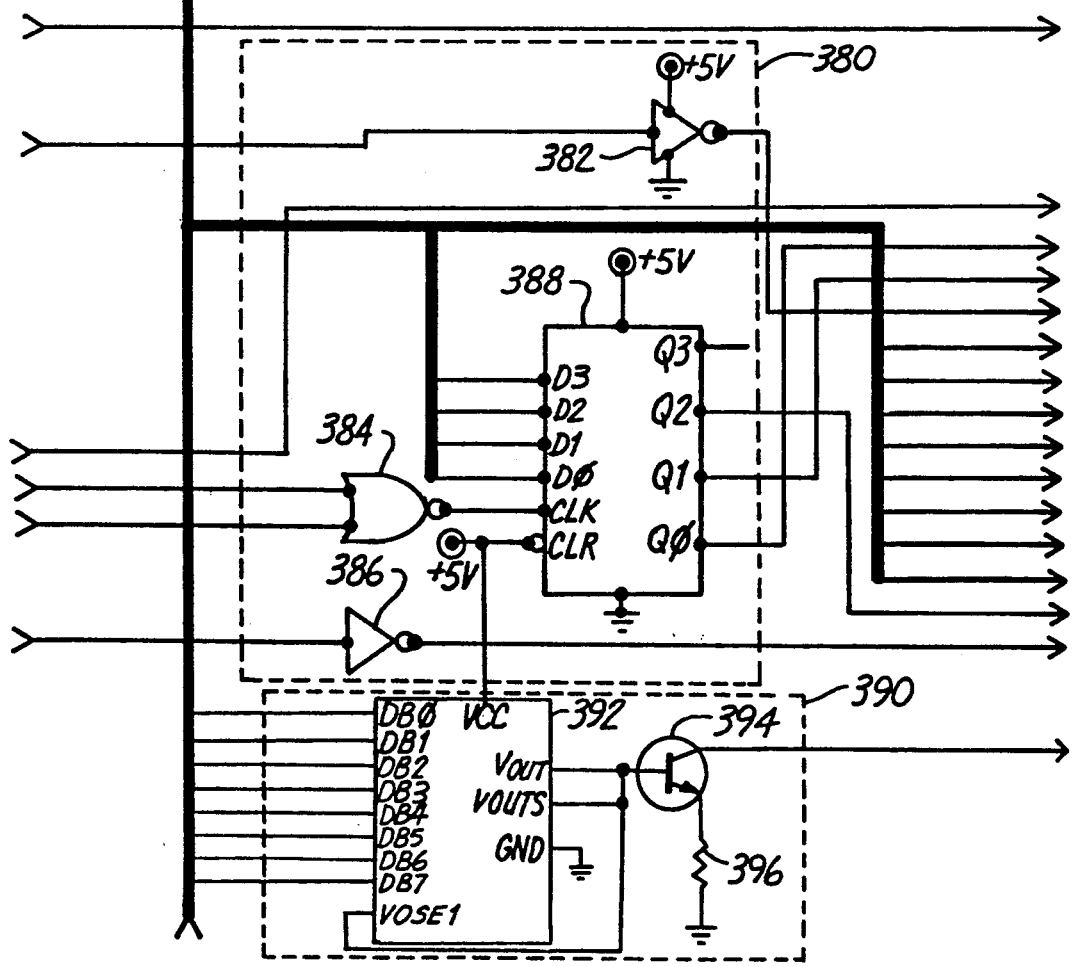
Fig. 5E

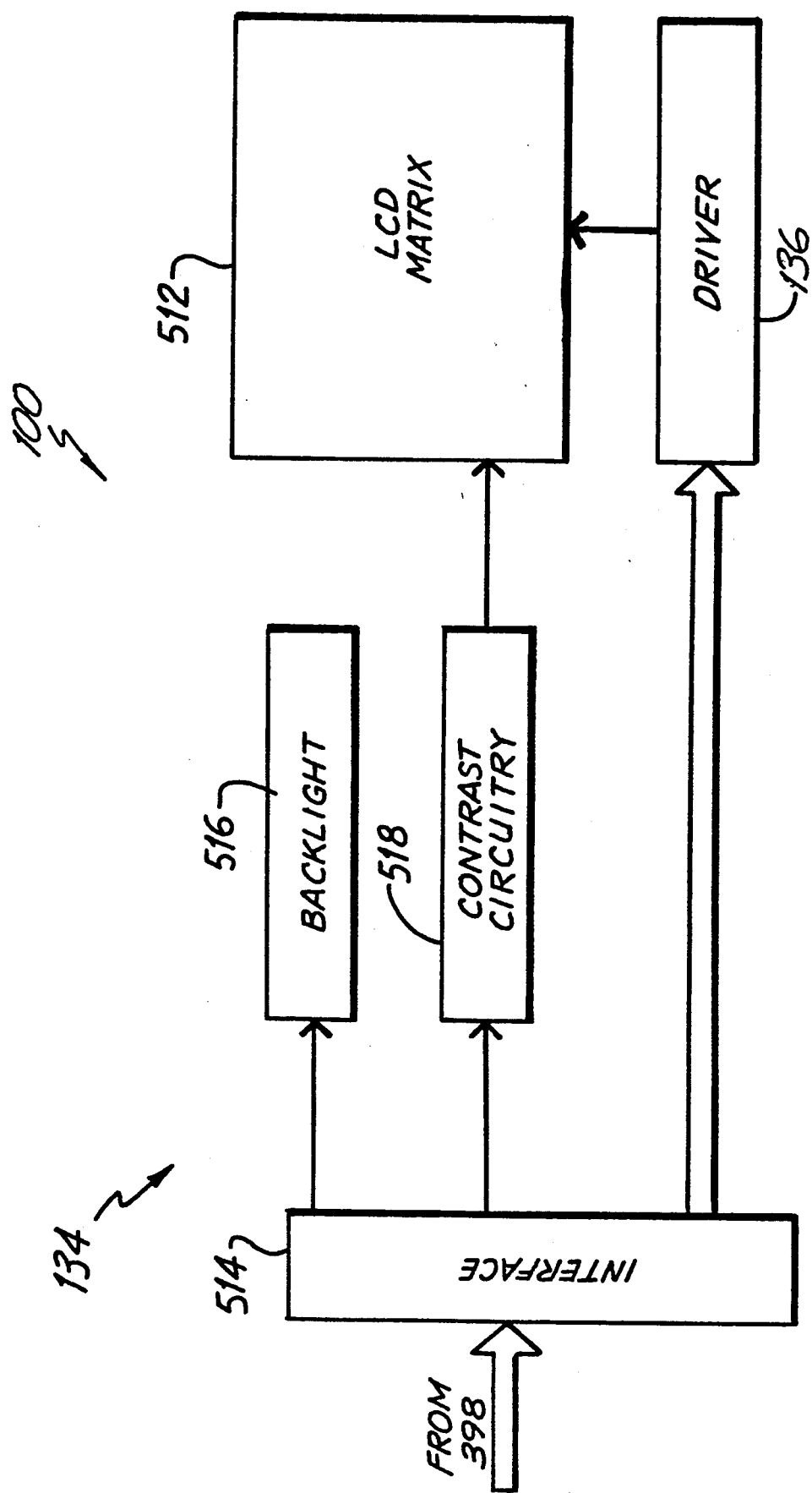

WHEEL ALIGNMENT SYSTEM

This is a continuation of application Ser. No. 07/753,896, filed on Aug. 30, 1991, abandoned as of the date of this application.

BACKGROUND OF THE INVENTION

The present invention relates to an automatic wheel alignment measurement system. In particular, the invention relates to a hand held wheel alignment system.

Proper alignment of the wheels of an automotive vehicle is important for both proper handling of the vehicle, as well as proper tire wear. The wheel alignment parameters which are measured and adjusted in order to achieve proper wheel alignment are camber, caster, steering axis inclination (SAI) and toe angle.

Camber is defined as the angle which the wheel makes with respect to a vertical plane when looking at the wheel from either the front or rear of the automobile. Any wheel of an automobile can have camber.

Caster is angle which the steering axis of a steerable wheel (typically one of the front wheels) makes with respect to a vertical plane which perpendicular to the longitudinal direction of the automobile.

Steering axis inclination (SAI) is the inclination of the steering axis with respect to a vertical plane which is parallel to the longitudinal direction of the automobile.

Toe was originally defined as the difference in the distance between the front edges of two opposite wheels and the distance between the rear edges of the same two wheels. Toe can also be defined in terms of a angular relationship of the plane of a wheel (perpendicular to its turning axis) relative to a predetermined longitudinal vehicle axis. When the forwardmost portions of a pair of adjacent wheels are closer together than the rear portions of those wheels, they are commonly referred to as in a "toe-in" condition. When the rear portions of wheels are closer together than the front portions, the condition is commonly referred to as "toe-out."

Camber is a tire wearing angle and also affects handling of the automobile Caster and SAI do not affect tire wear but are important for directional control. Toe is a tire wearing angle and also affects the position of the steering wheel required to maintain travel of the automobile along a straight line.

Caster, Camber, and SAI are typically measured using head units coupled to the wheels of an automobile and attached to a hand held module. For example, U.S. Pat. No. 4,594,789 by Marino et al describes an automatic wheel alignment system and is incorporated herein by reference.

Prior art automatic wheel alignment systems typically require a console which is set apart from the automobile. This console typically weighs several hundred pounds and stands four to six feet high and two to four feet wide. Often, it is difficult for an operator to view the console while simultaneously adjusting camber, caster, SAI, and toe of the wheel.

There is a continuing need for an automatic wheel alignment system which is convenient to use and provides an improved user interface.

SUMMARY OF THE INVENTION

The present invention is an automatic wheel alignment system for aligning the wheels of an automotive vehicle. The wheel alignment system includes four head units adapted for coupling to the wheels of the automotive vehicle. The head units are coupled to a hand held module which provides alignment information to an operator. The hand held module includes a communication means operably coupled to the head units for receiving angle measurements and providing an output. A memory stores computer program instructions and vehicle specification information. An input means receives an input from an operator. A microprocessor coupled to the communication means, the memory and the input means provides a display data output related to an angular relationship of the wheels of the vehicle. A liquid crystal display is coupled to the microprocessor and includes a liquid crystal display matrix for forming an image based upon the display data output. A contrast control means coupled to the liquid crystal display provides a contrast signal. A liquid crystal display back light control controls back lighting to the liquid crystal display. The hand held module provides audible feedback to an operator so that the wheels can be aligned without visually monitoring the display.

BRIEF DESCRIPTION OF THE DRAWINGS

FIGS. 5A through 5K show a schematic diagram for a hand held module in accordance with the present invention.

FIG. 6 shows a block diagram of a liquid crystal display module.

DETAILED DESCRIPTION OF THE PREFERRED EMBODIMENTS

Figure 1:
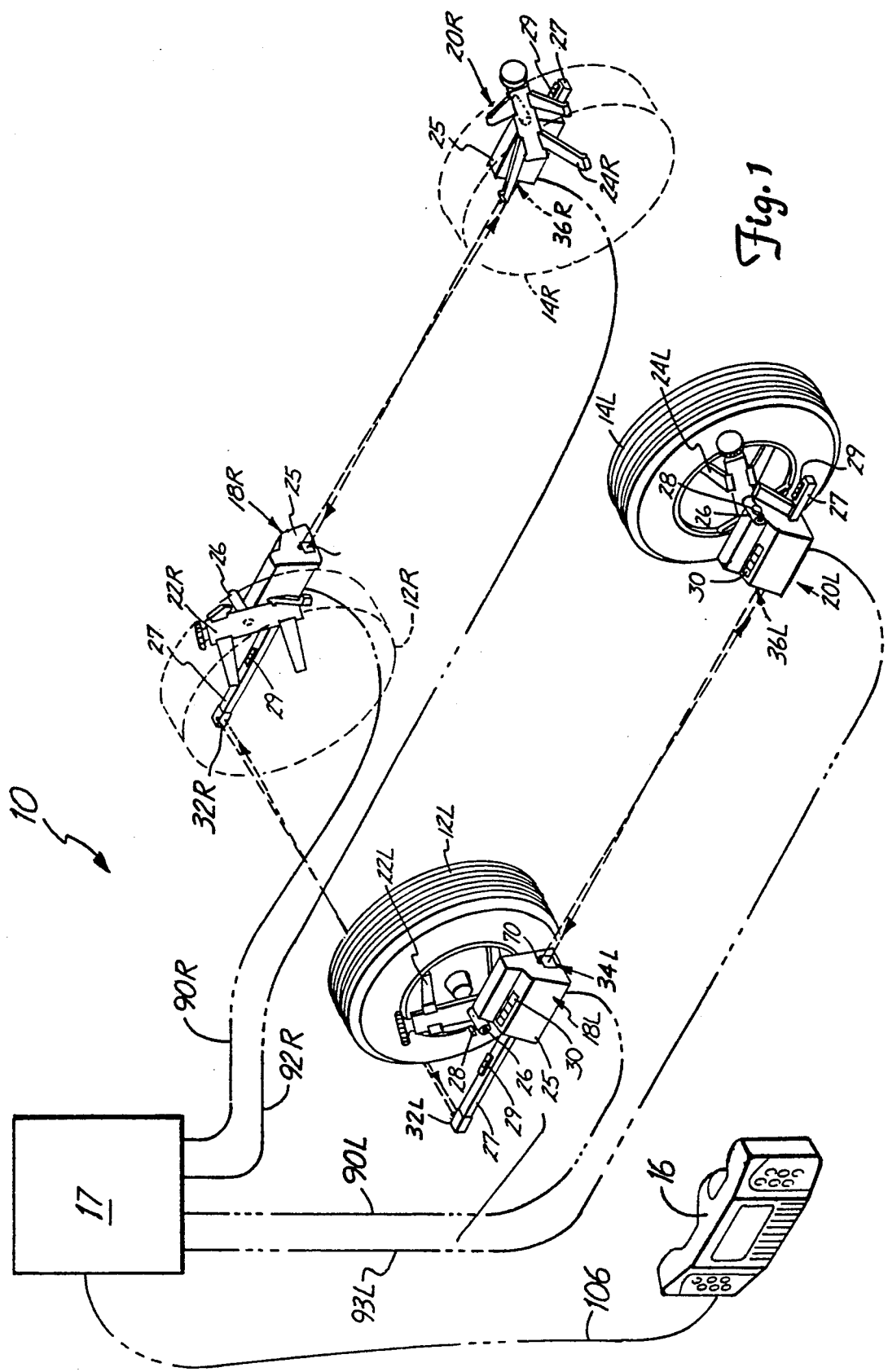
FIG. 1 shows a wheel alignment system in accordance with the present invention coupled to the wheels of an automotive vehicle.

In FIG. 1, wheel alignment system 10 of the present invention is used to measure the alignment of left front wheel 12L, right front wheel 12R (shown in phantom), left rear wheel 14L, and right rear wheel 14R (shown in phantom) of an automotive vehicle. For clarity, the remaining portions of the vehicle are not shown. System 10 includes a hand held module 16, left and right front head units 18L and 18R, and left and right rear units 20L and 20R. Head units 18L, 18R, 20L, and 20R are connected to hand held module 16 through power source 17.

Head units 18L, 18R, 20L and 20R are supported on wheels 12L, 12R, 14L and 14R by rim clamps 22L, 22R, 24L and 24R, respectively. Rim clamps 22L, 22R, 24L and 24R are self-centering, four-leg rim clamps which fit a wide range of different wheel sizes without the need for special adapters. Each head unit (18L, 18R, 20L, 20R) includes a housing 25, a sleeve 26 and an arm 27. Sleeve 26 mounts over a spindle of the corresponding rim clamp. Each head unit (18L, 18R, 20L, 20R) is locked into position on the spindle of the corresponding rim clamp (22L, 22R, 24L, 24R) by spindle clamp 28. A bubble level 29 mounted on arm 27 provides a visual indication to the mechanic that the head unit (18L, 18R, 20L, 20R) is level horizontally before spindle clamp 28 is clamped. A set of switches 30 on housing 25 allows an operator to signal hand held module 16 that a measurement should be made and to respond to messages displayed by hand held module 16.

In wheel alignment system 10 shown in FIG. 1, there are a total of six angle sensor units which are used to measure toe angles, a total of four camber sensors which are used to measure camber values and a total of two pitch sensors which are used to measure pitch values. Front left head unit 18L carries left-to-right sensor 32L and front-to-rear sensor 34L. Left rear head unit 20L carries rear-to-front angle sensor 36L. Right front head unit 18R includes right-to-left sensor 32R and front-to-rear sensor 34R. Right rear head unit 20R carries rear-to-front angle sensor 36R.

The angle sensor units are arranged to operate as pairs. Sensors 32L and 32R are mounted at the front ends of arms 27 of front head units 18L and 18R and face one another. Sensor 34L is mounted at the rear of housing 25 of head unit 18L and faces sensor 36L which is mounted at the front end of head unit 20L. Similarly, sensor 34R of head unit 18R faces sensor 36R of head unit 20R.

Figure 2:
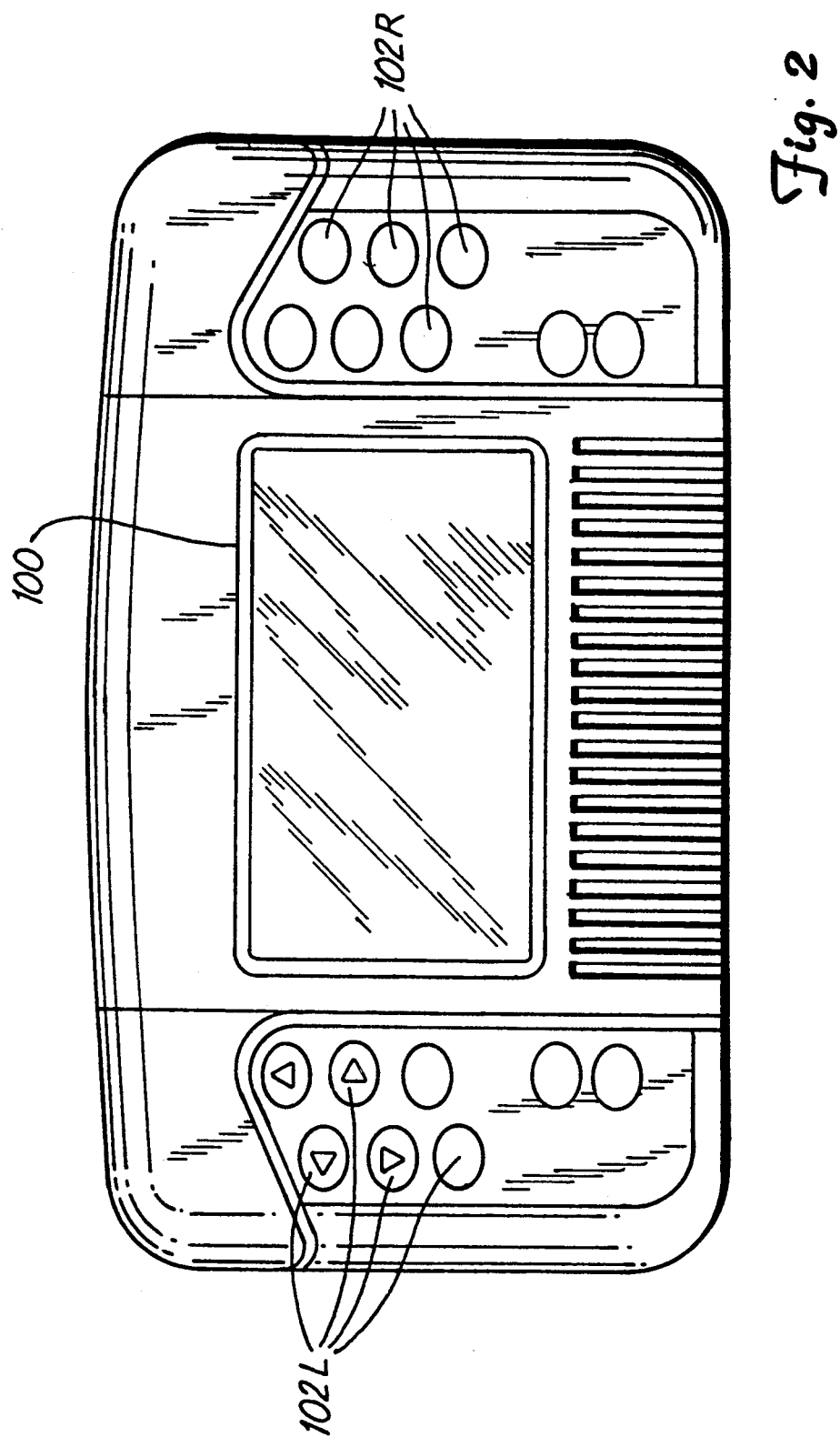
FIG. 2 is a front view of a hand held module for the wheel alignment system of FIG. 1.
Figure 3:
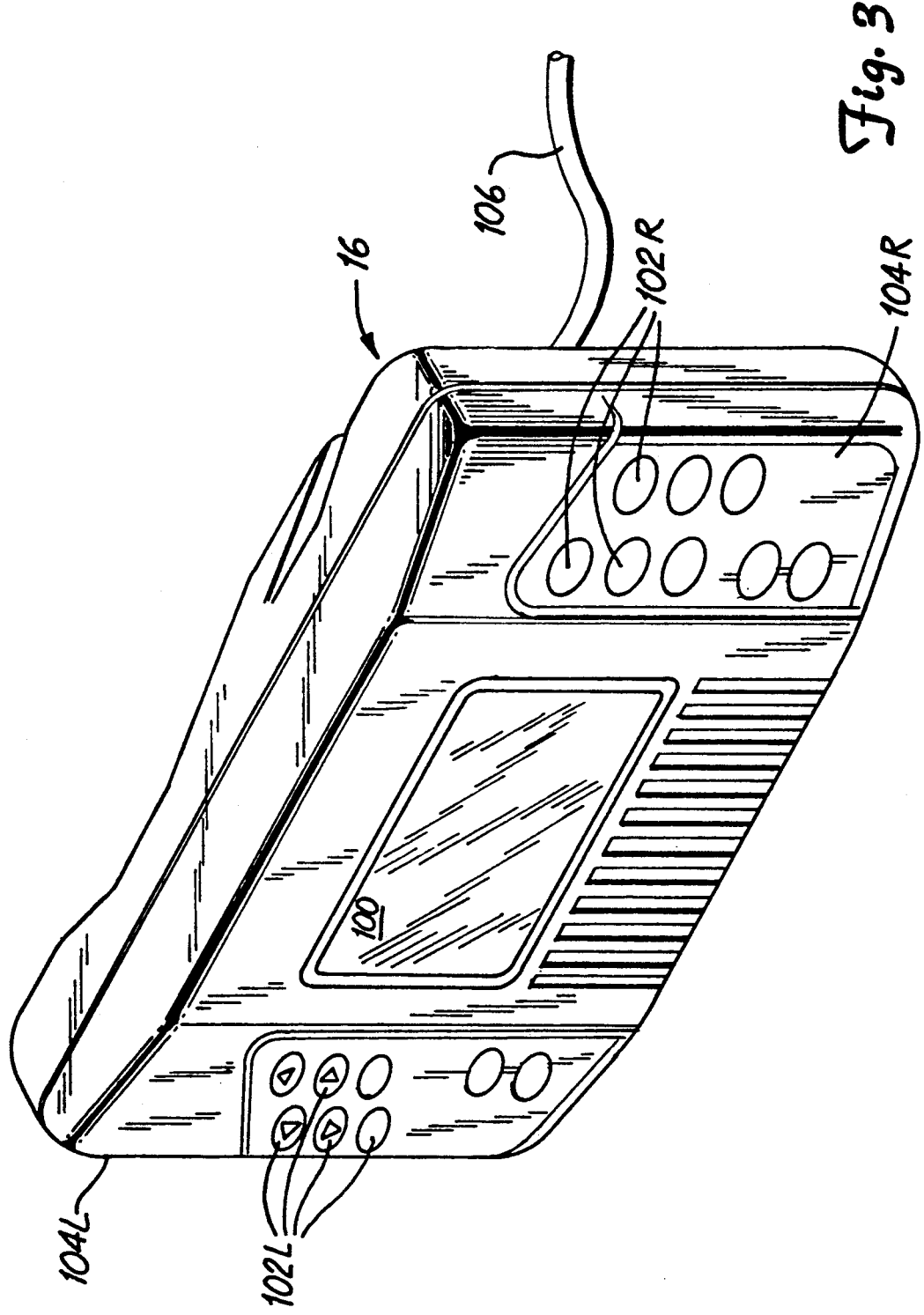
FIG. 3 is a perspective view of the hand held module.

FIG. 2 shows a front view of hand held module 16. Hand held module 16 includes liquid crystal display 100 and operator buttons 102L and 102R. Buttons 102L are positioned for operation by the left hand of an operator. Similarly, operator buttons 102R are positioned for right hand operation. FIG. 3 is a perspective view of hand held module 16 and shows left hand grip region 104L and right hand grip region 104R. Cable 106 connects hand held module 16 to power supply 17. In a preferred embodiment, hand held module 16 is about 6 inches high, 10 inches wide and 8 inches deep, and weighs about three pounds.

Figure 4:
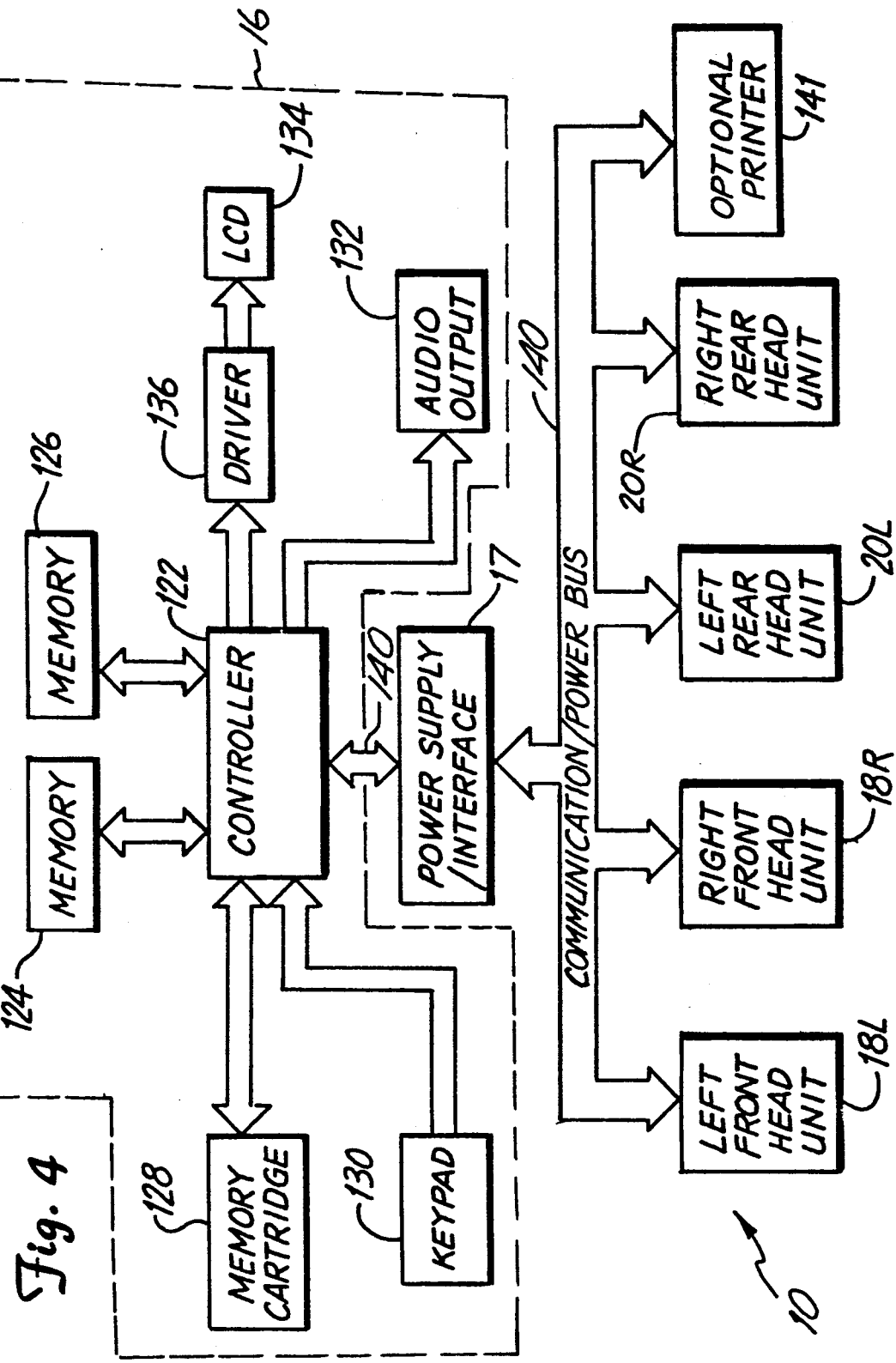
FIG. 4 is a block diagram of the wheel alignment system of the present invention.

FIG. 4 is a block diagram of a wheel alignment system 10 of the present invention. Handheld module 16 is centered around controller 122. Controller 122 is connected to memory modules 124 and 126 and memory cartridge 128. Controller 122 is also connected to keypad 130 and audio output 132. Controller 122 is connected to liquid crystal display 134 through driver 136. Controller 122 is also connected to left front head unit 18L, right front head unit 18R, left rear head unit 20L, and right rear head unit 20R through power supply/interface 17. As shown in FIG. 4, controller 122 is connected to head units 18L, 18R, 20L, and 20R through power supply/interface 17 and a communication/power bus 140. Bus 140 consists of cables 90L, 90R, 92L, 92R, and 106 shown in FIG. 1. An optional printer 141 connects to communication/power bus 140.

Figure 5:
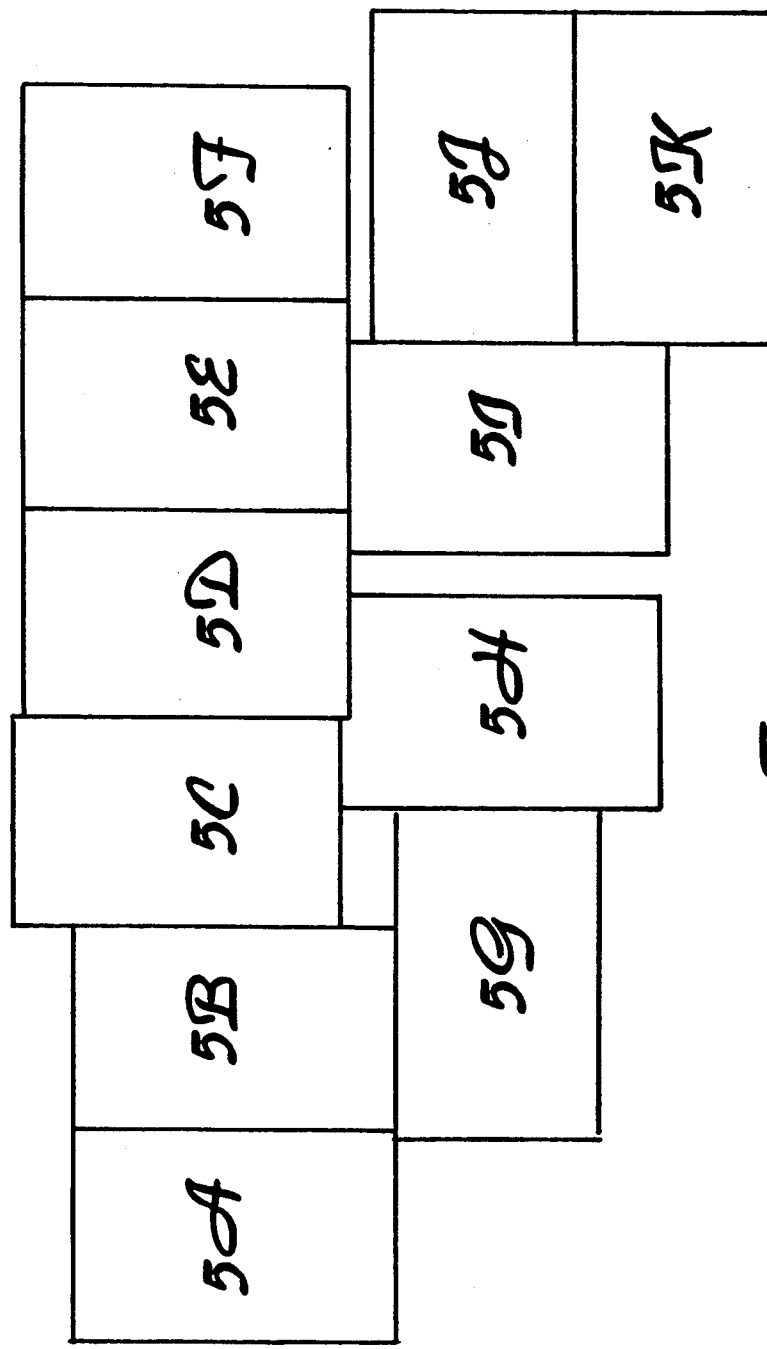
FIG. 5 is a diagram which shows the relationship of FIGS. 5A, 5B, 5C, 5D, 5E, 5F, 5G, 5H, 5I, 5J, and 5K.

FIG. 5 shows the relationship between FIGS. 5A through 5K. FIGS. 5A through 5K show the schematic diagram for controller 122, memory 124 and 126 and audio output 132 shown in FIG. 4.

Figure 5A:
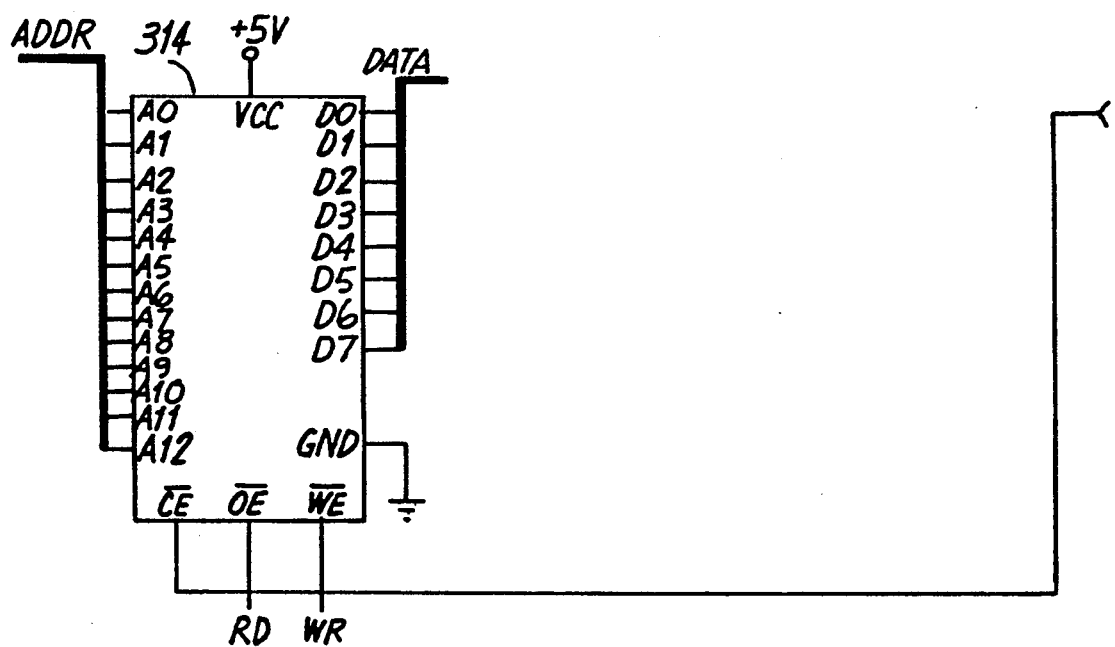

FIG. 5A shows integrated circuit 314 which includes address lines A0 through A12 and data lines D0 through D7. Integrated circuit 314 comprises an 8K EEPROM such as μPD28C64. Integrated circuit 314 is connected to a +5 volt power supply and ground. Integrated circuit 314 includes a $\overline{CE}$ input.

Figure 5B:
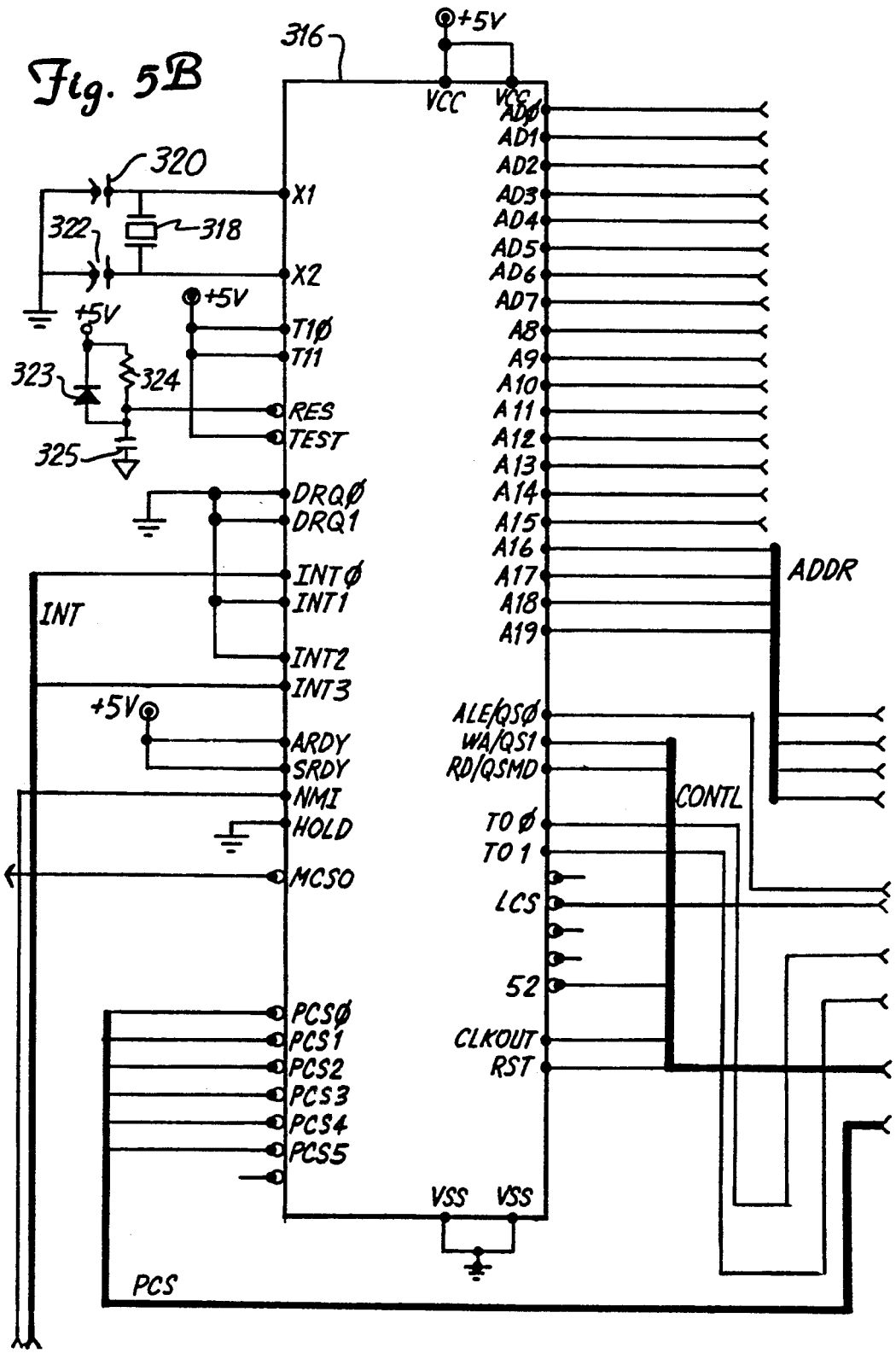

FIG. 5B shows controller 316. In a preferred embodiment, controller 316 comprises an 80C188 microprocessor. Controller 316 includes VCC connections to a +5 volt supply and VSS connections to electrical ground. Crystal 318 is connected to ground by capacitors 320 and 322 and is connected to X1 and X2 inputs to controller 316. Inputs T10, T11 and TEST are connected a +5 volt power supply. RES input to integrated circuit 316 connects to a +5 volt power supply through diode 323 and resistor 324. Capacitor 325 connects RES input to electrical ground. DRQ0, DRQ1, INT1, INT2, and NMI inputs to controller 316 are connected to electrical ground. Interrupts inputs INT0, and INT3 are connected to an INT bus. ARDY and SARDY inputs are connected to the +5 volt supply. A HOLD input to controller 316 is connected to electrical ground. PCS0 through PCS5 (Peripherial Chip Select) lines are connected to a PCS bus. Controller 316 includes address outputs AD0 through AD7 and A8 through A19. WR, RD, CLK, and RST lines are connected to a control bus.

Figure 5C:
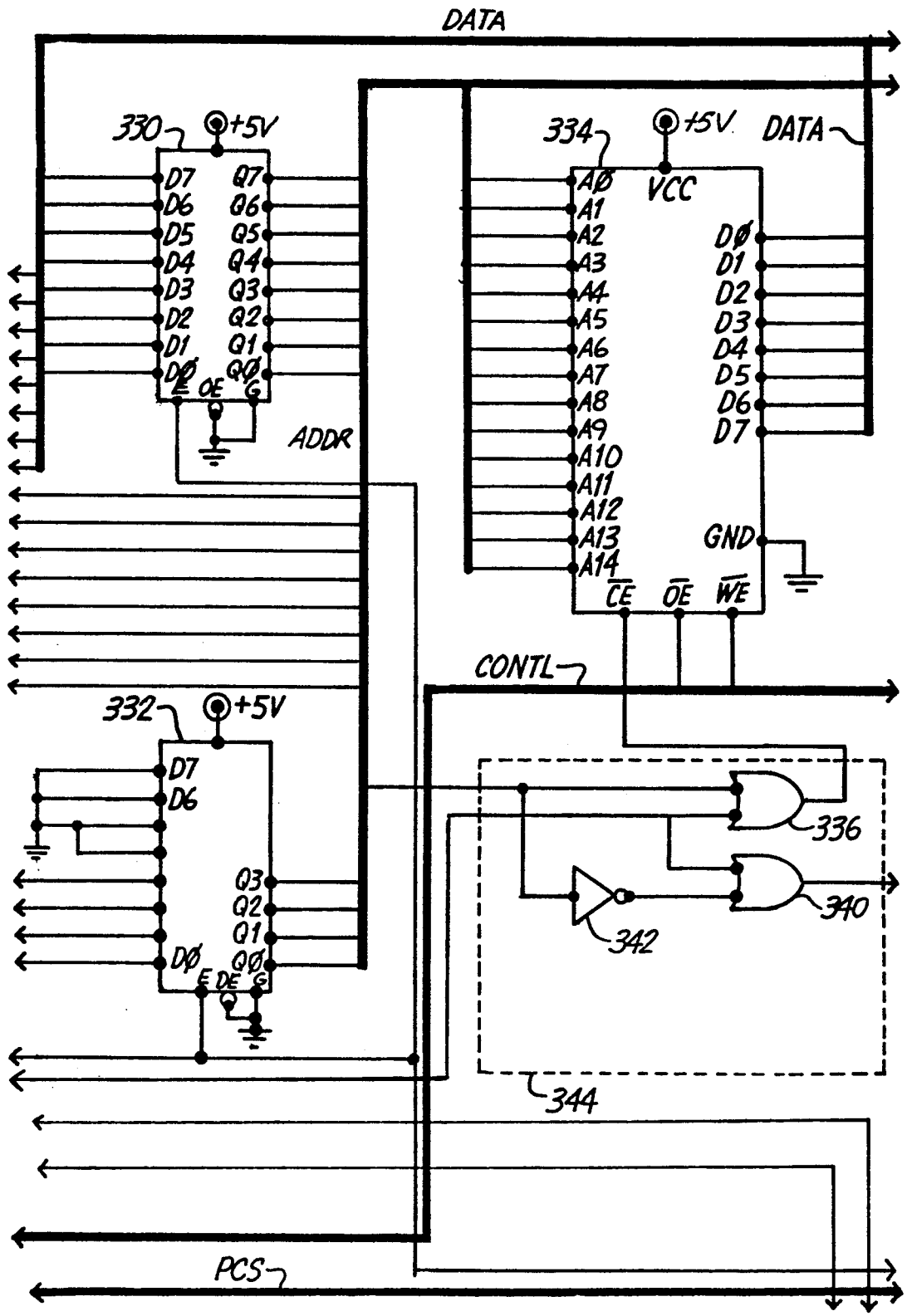

FIG. 5C shows integrated circuit 330 having data inputs D0 through D7 and outputs Q0 through Q7. Integrated circuit 330 is a buffer such as an HC373. Integrated circuit 330 includes a +5 volt power supply connection and a ground connection. Integrated circuit 330 includes an enable input. Data inputs D0 through D7 of integrated circuit 330 are coupled to address outputs AD0 through AD7 of controller 316.

Integrated circuit 332 shown in FIG. 5C includes D0 through D7 inputs and Q0 through Q3 outputs. Integrated circuit 332 comprises a buffer such as an HC373. Integrated circuit 332 includes a +5 volt power supply connection and a ground connection. Integrated circuit 332 also includes an enable input which is coupled to integrated circuit 316 shown in FIG. 5B. Integrated circuit 334 includes address inputs A0 through A14, data lines D0 through D7, a VCC power supply connection, and a ground connection. Integrated circuit 334 comprises a 32 K RAM such as a 62256. Integrated circuit 334 includes output enable and write enable inputs connected to control data bus CONTL. Integrated circuit 334 is also connected to OR gate 336. OR gate 336 is connected to address bus ADDR and integrated circuit 316 shown in FIG. 5B.

Figure 5D:
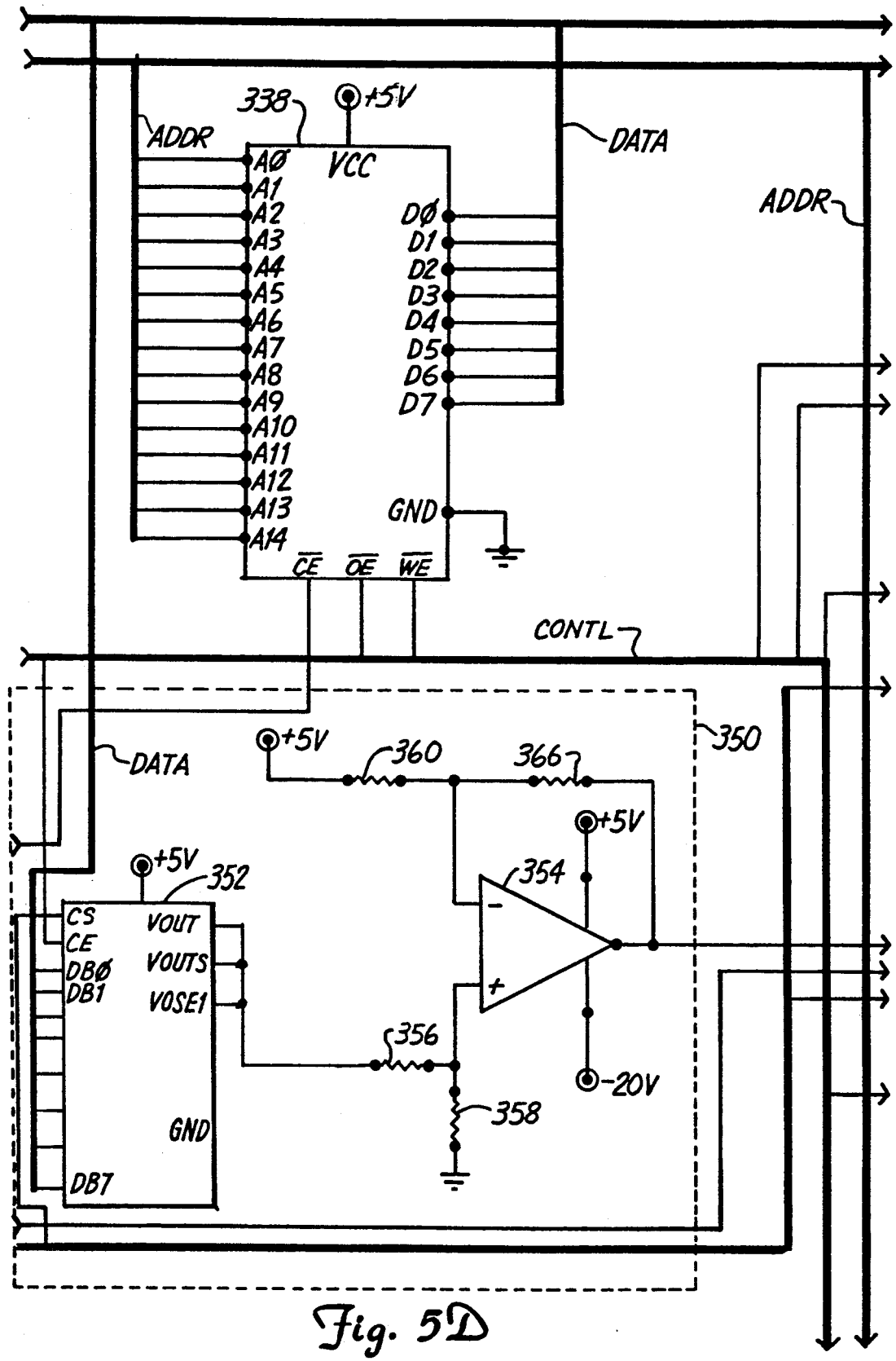

FIG. 5D shows integrated circuit 338 having address inputs A0 through A14 connected to address bus ADDR and data connection D0 through D7 connected to data bus DATA. Integrated circuit 338 comprises a 32 K RAM such as a 62256. Integrated circuit 338 includes a VCC power supply connection and a ground GND connection. Integrated circuit 338 also includes $\overline{CE}$, $\overline{OE}$, and $\overline{WE}$ connections. The $\overline{CE}$ connection to integrated circuit 338 is connected to OR gate 340 which has one input connected to inverter 342 shown in FIG. 5C. OR gates 336 and 340 and inverter 342 form a RAM chip select circuit 344.

FIG. 5D also shows liquid crystal display contrast control circuitry 350. Liquid crystal display contrast control circuitry 350 includes integrated circuit 352 and OPAMP 354. Integrated circuit 352 comprises an AD558 and is connected to a +5 volt power supply and electrical ground. Integrated circuit 352 includes DB0 through DB7 inputs which are connected to a data bus. Integrated circuit 352 also includes a voltage output $V_{out}$ which is connected to the non-inverting input of OPAMP 354 through a resistor 356. The non-inverting input is also connected to ground through resistor 358. The inverting input of operational amplifier 354 is connected to a +5 volt supply through resistor 360. Feedback is provided from the output of operational amplifier 354 through resistor 366. Operational amplifier 354 is also connected to the +5 volt power supply and a −20 volt power supply.

FIG. 5E shows an EPROM chip select circuit 370. EPROM chip select circuit 370 comprises OR gates 372 and 374, NOR gate 376 and inverter 378. OR gate 372 and NOR gate 376 are coupled the address bus ADDR and inverter 378 is connected to the control bus CONTL.

FIG. 5E also shows liquid crystal display control circuit 380. Liquid crystal display control circuit 380 includes buffer 382, NOR gate 384, inverter 386 and integrated circuit 388. Integrated circuit 388 comprises an HC175 and includes a +5 volt power supply connection and a ground connection. Integrated circuit 388 include clear, clock, and D0 through D3 inputs and Q0 through Q3 outputs.

FIG. 5E also shows liquid crystal display back lighting control circuitry 390. Liquid crystal display back lighting control circuitry 390 includes integrated circuit 392 and transistor 394. Integrated circuit 392 comprises an AD558 having data inputs DB0 through DB7 connected to the data bus. Integrated circuit 392 also includes power supply VCC and ground connections. An output VOUT from integrated circuit 392 is connected to the base of transistor 394. The emitter of transistor 394 is connected to ground through a resistor 396. Resistor 396 comprises a 7.5 Ω resistor.

Figure 5F:
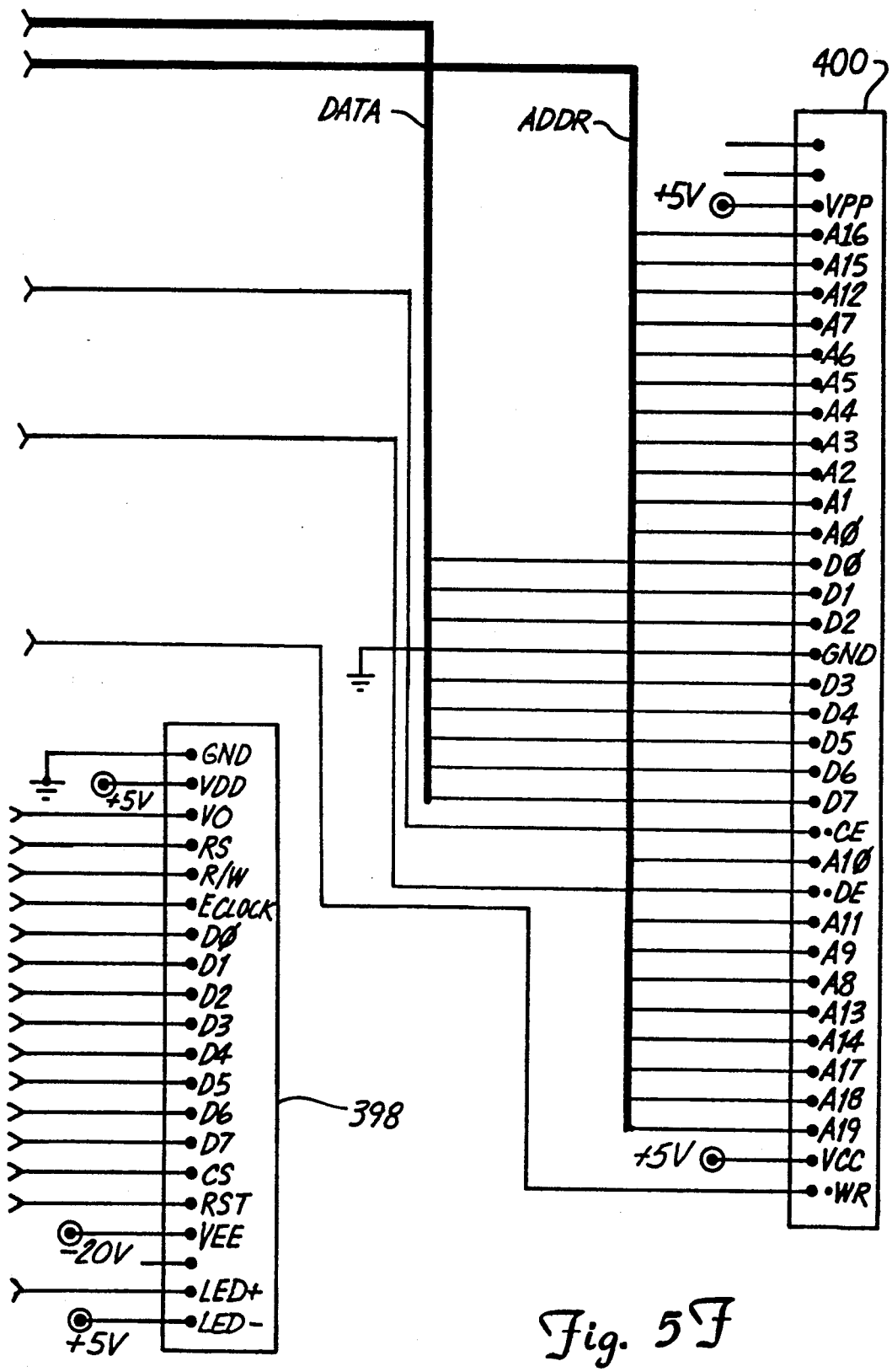

FIG. 5F shows liquid crystal display connector 398 and memory cartridge connector 400. Liquid crystal display connector 398 is connected to the data bus. In a preferred embodiment, liquid crystal display connector 398 connects an LMH4129BG5212 available from Densitron Corporation of Torrance, Calif. Memory cartridge connector 400 is coupled to the data bus and address bus and is designed to connect to EPROM modules.

Figure 5G:
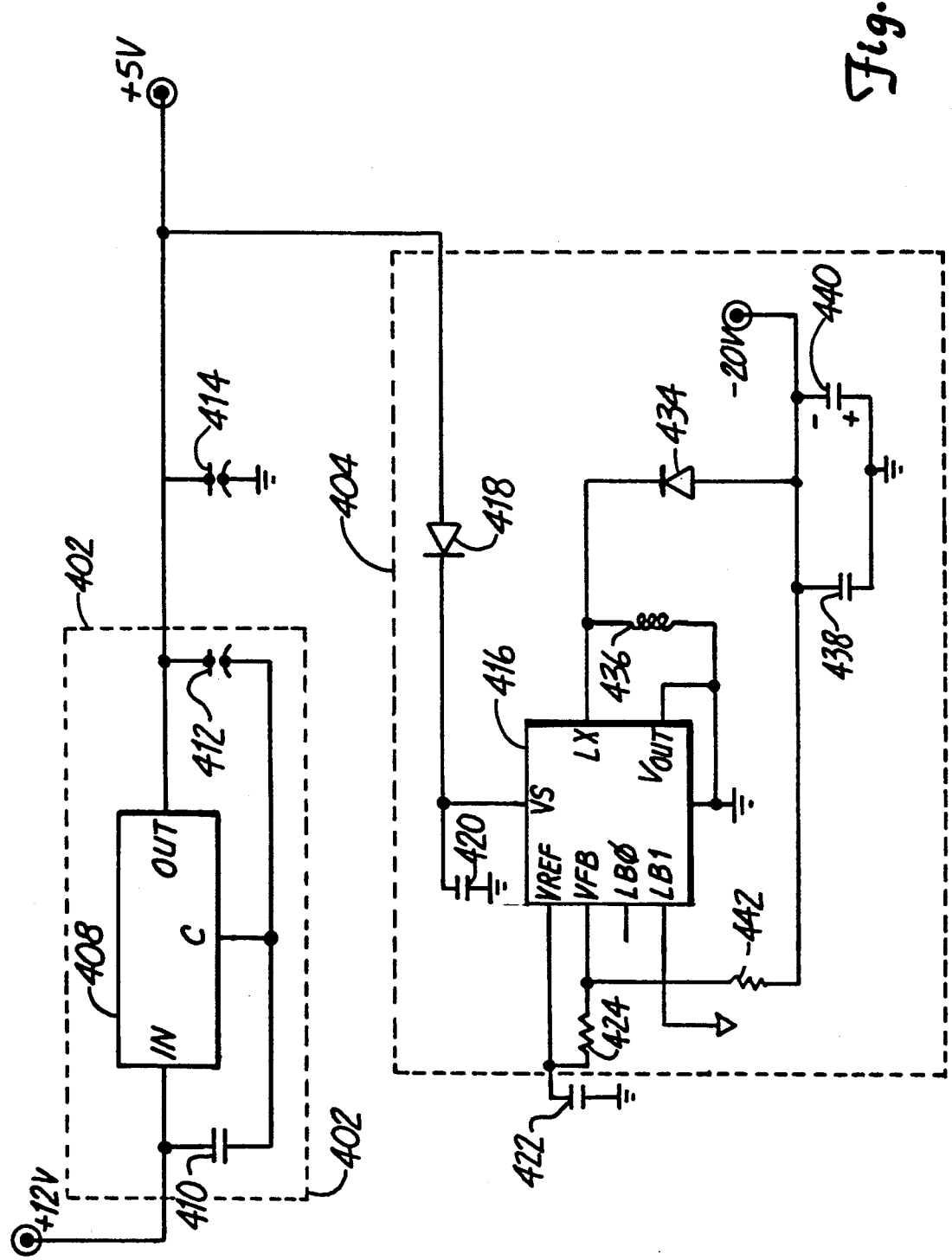

FIG. 5G shows +5 volt regulator circuit 402, −20 volt regulator circuit 404. +5 volt regulator circuit 402 comprises integrated circuit 408, capacitor 410, and capacitor 412. Integrated circuit 408 comprises a 78SR105 IC with an input connected to a +12 volt source. Integrated circuit 408 provides a +5 volt output. Filter capacitor 414 is connected between the +5 volt output and ground. Filter capacitor 414 comprises a 22 μFarad capacitor.

−20 volt regulator 404 includes an integrated circuit 416. Integrated circuit 416 is an MAX637 and has a power supply input connected to the +5 volt power supply through diode 418. The power supply input to integrated circuit 416 is also connected to electrical ground through capacitor 420. A voltage output from integrated circuit 416 is connected to electrical ground. A VREF input is connected to electrical ground through capacitor 422. A VFB connection to integrated circuit 416 is connected to the VREF connection through resistor 424. Resistor 424 comprises a 10 K Ω. An LB1 connection to integrated circuit 416 is connected to GND. The −20 volt output is connected to the LX connection of integrated circuit 416 through diode 434 and to electrical ground and a VOUT connection to integrated circuit 416 through inductor 436. Inductor 436 comprises a 330 μH inductor. The −20 volt output connects to electrical ground through capacitor 430 and 440. Capacitor 438 comprises a 0.1 μFarad and capacitor 440 comprises a 100 μFarad capacitor. The −20 volt output also connects to the VFB connection to integrated circuit 416 through 140 K Ω resistor 442.

Figure 5H:
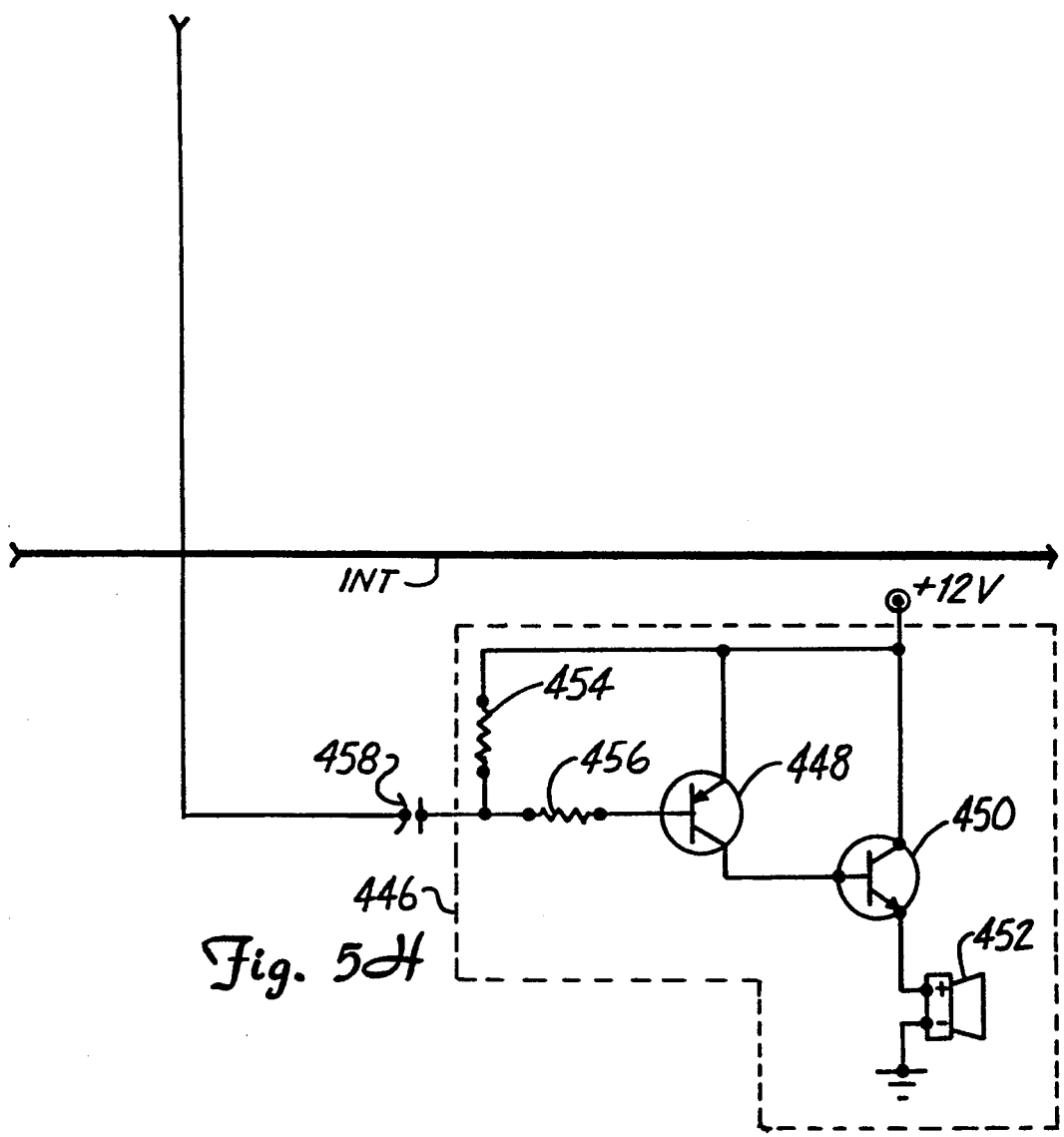

FIG. 5H shows Darlington pair driver circuit 446. Darlington pair driver circuit 446 includes transistors 448 and 450, speaker 452, and resistors 452 and 446. Transistor 448 comprises a PNP transistor. Transistor 450 comprises an NPN transistor. The base of transistor 448 is connected to integrated circuit 316 through resistor 456 and capacitor 458. The base of transistor 448 is also connected to a +12 volt power supply through resistor 454. Resistor 454 comprises a 4.7 K Ω resistor and resistor 456 comprises a 1.24 K Ω resistor.

FIG. 5I shows integrated circuit 460 having a VDD connection to the +5 volt power supply and a ground connection connected to electrical ground. Integrated circuit 460 comprises a UART such as a 7105171051. Integrated circuit 460 includes data inputs D0 through D7 connected to the data bus.

Figure 5J:
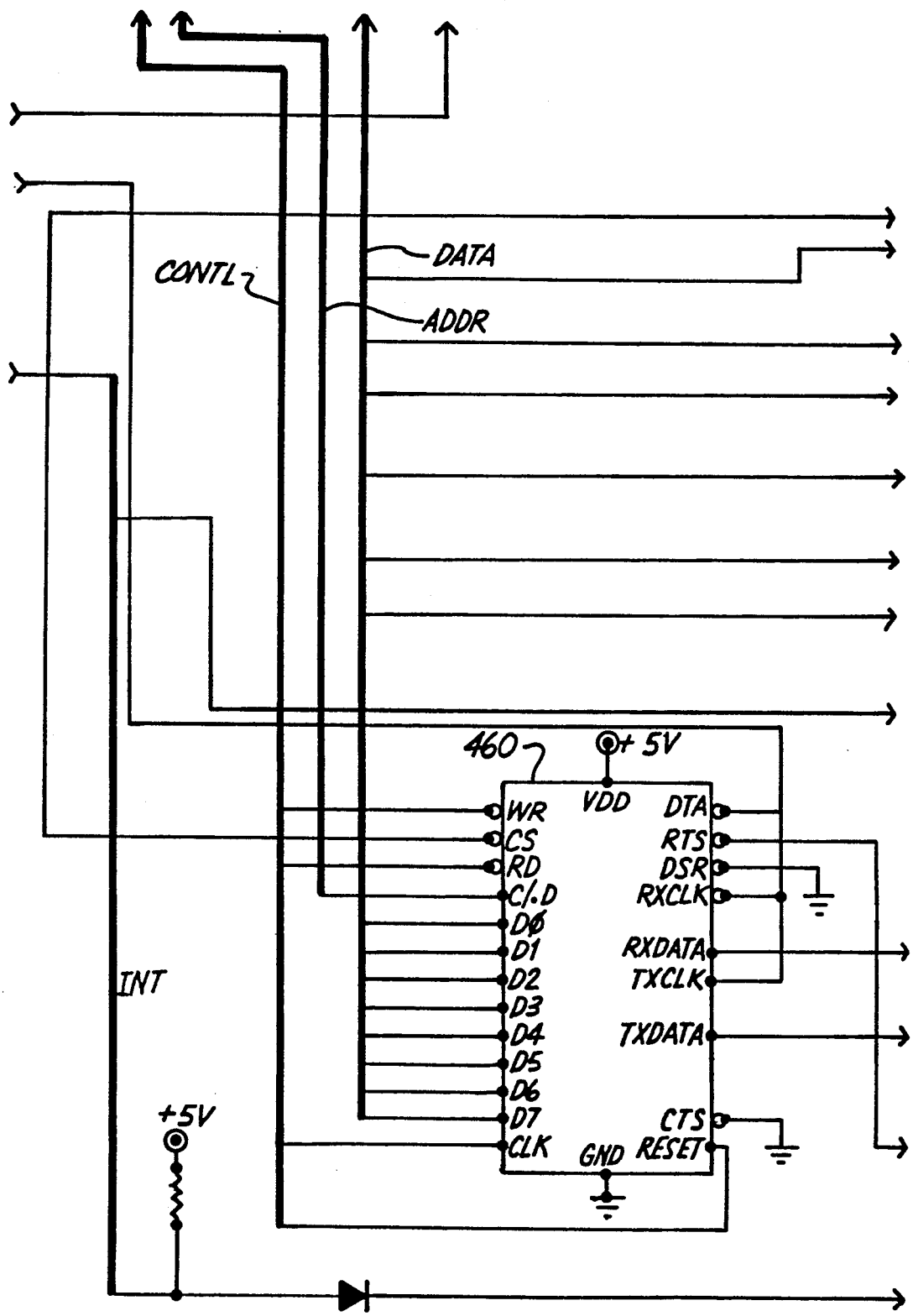
Figure 5J:
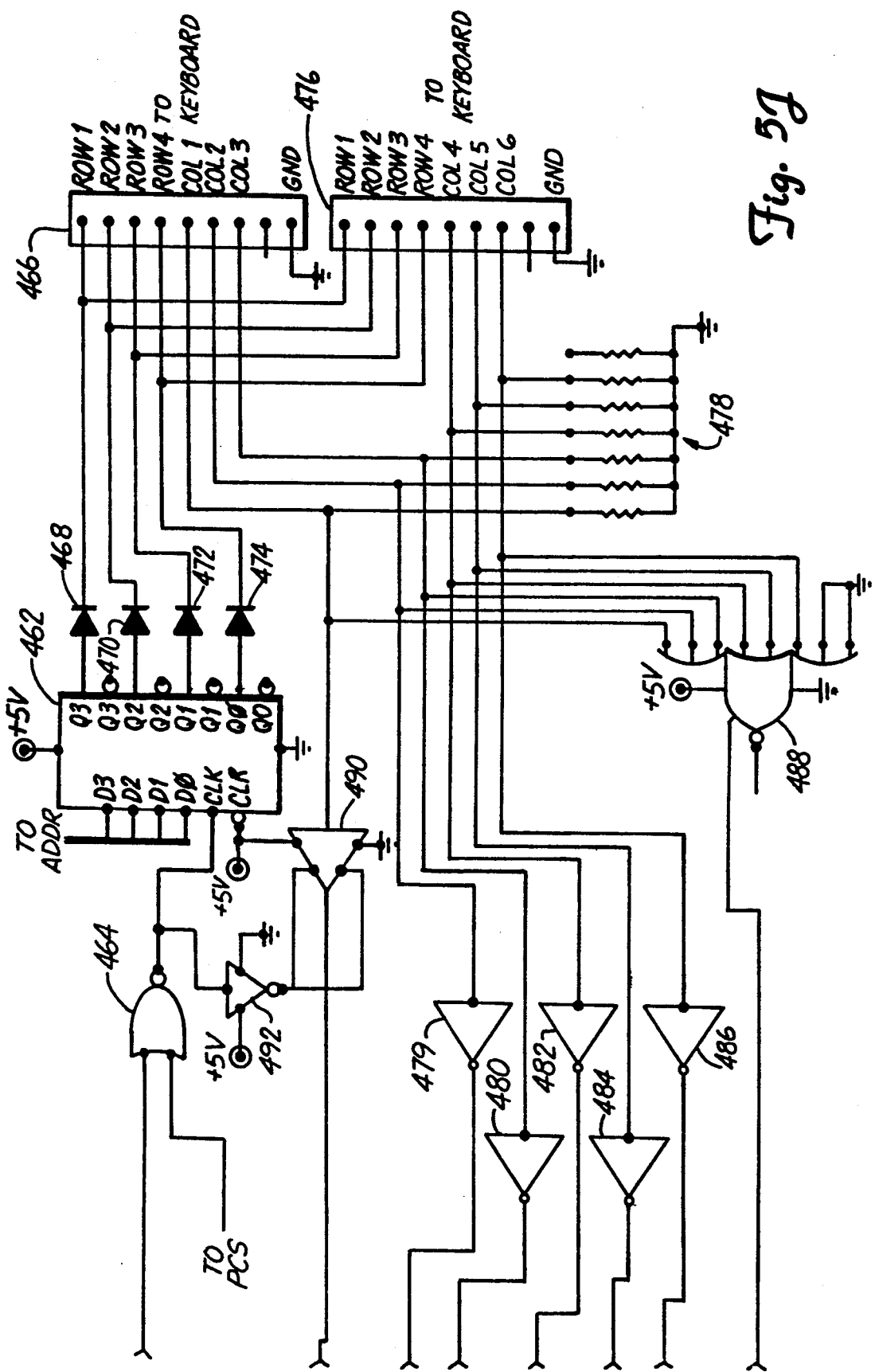

FIG. 5J shows integrated circuit 462. Preferably, integrated circuit 462 comprises an HC175 latch. Integrated circuit 462 include data inputs D0, D1, D2, and D3. Integrated circuit 462 include CLK input connected NOR gate 464. Integrated circuit 462 includes a CLR input connected to a +5 volt power supply. Integrated circuit 462 is also connected to keyboard connection 466 through diode 468, 470, 472, and 474. Integrated circuit 462 is also connected to the +5 volt power supply and electrical ground. Keyboard connector 466 includes ROW connections ROW1, ROW2, ROW3, AND ROW4 and column connections COL1, COL2, and COL3. Keyboard connection 476 includes ROW connection, ROW1, ROW2, ROW3, and ROW4 and column connections COL1, COL5, and COL6. Keyboard connectors 466 and 476 are connected to electrical ground through resistors 478. Resistors 478 comprise 1 K Ω resistors. Keyboard connectors 466 and 476 are coupled to the DATA bus through tri-state buffers 479, 480, 482, 484, and 486. Keyboard connectors 466 and 476 are also connected to the system interrupt through multi-input NOR gate 488. Keyboard connectors 466 and 476 are also connected to DATA bus through gate 490 which is also connected to NOR gate 464 through inverter 492.

Figure 5K:
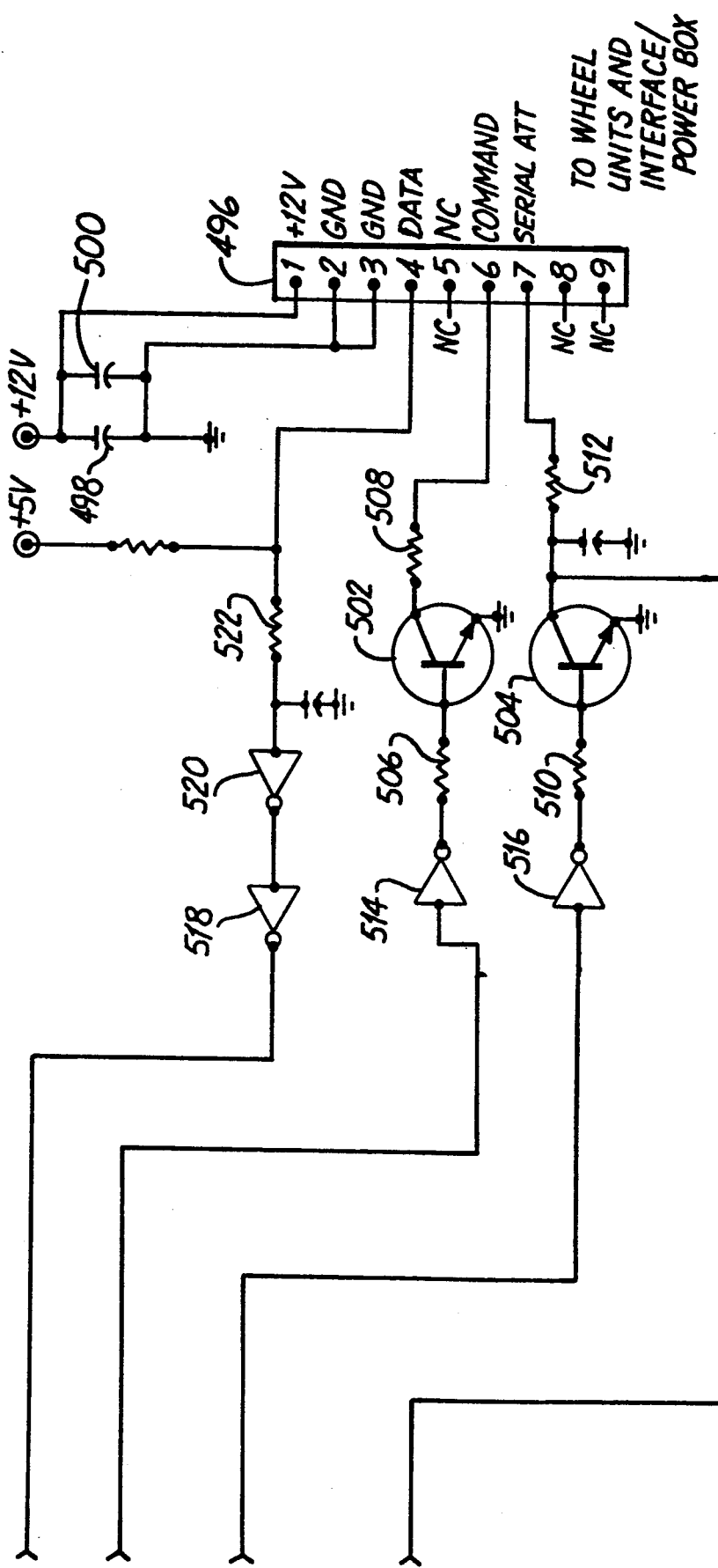

FIG. 5K shows connector 496 connected to wheel unit. Connector 496 include +12 volt, ground data, and command connections. Connector 496 is connected to the +12 volt power supply through capacitor 498 and 500. Connector 496 is connected to integrated circuit 460 through driver transistors 502 and 504, resistors 506, 508, 510, and 512 and invertors 514 and 516. Connector 496 is also connected to integrated circuit 460 through inverter 518 and 520, and resistor 522.

In the circuit diagram of FIGS. 5A through 5K, liquid crystal display connector 398 connects to liquid crystal display 134 shown in FIG. 4. Driver circuitry 136 of FIG. 4 includes liquid crystal display control circuit 380, liquid crystal display back lighting control 390, and liquid crystal display contrast control 350. Audio output block 132 shown in FIG. 4 include speaker driver 446. Keypad 130 shown in FIG. 4 connects to keypad connectors 466 and 476. Connector 496 provides a serial data connector for coupling to head units 18L, 18R, 20L, and 20R through power supply/interface 17.

FIG. 6 shows display 100, which includes a liquid crystal display module 134 and driver 136. Liquid crystal display module is coupled to connector 398 and is in communication with controller 316. Liquid crystal display module 134 includes liquid crystal display matrix 512, interface 514, back light 516, and contrast circuitry 518. Driver 136 is connected to liquid crystal display matrix 512 to drive the liquid crystal element in matrix 512. Contrast control circuitry 518 is connected to control the contrast of liquid crystal display matrix 512. Back light 516 is positioned to provide a lighting source for liquid crystal display matrix 512.

In operation, an operator connects head units 18L, 18R, 20L, and 20R to wheels 12L, 12R, 14L, and 14R of an automotive vehicle. Head units 18L and 18R are connected to power supply 17 through multiconductor cables 90L and 90R, respectively. Head units 20L and 20R are connected to power supply 17 through multiconductor cables 92L and 92R, respectively. Cables 90L, 90R, 92L, and 92R carry power to head units 18L, 18R, 20L, and 20R. Cables 90L, 90R, 92L, and 92R also are used by alignment system 10 to communicate with head units 18L, 18R, 20L, and 20R.

Hand held module 16 is connected to power supply 17 and receives power through cable 106. Cable 106 is also used for communication with head units 18L, 18R, 20L, and 20R. During operation, an operator can move hand held module 16 around the vehicle while wheels 12L, 12R, 14L, and 14R are aligned. Power supply/interface 17 is mounted on a wall or table (not shown) or may be contained in a rack (not shown) which is used to lift the vehicle. The operator receives instructions through display 100 and enters commands and information through buttons 102L and 102R on hand held module 16 or through buttons 30 on head units 18L, 18R, 20L, and 20R. Alignment system 10 is controlled by microprocessor 316 shown in FIG. 5B. Controller 316 stores information in RAMs 334 and 338. Controller 316 receives input from the operator through keypad 130 which is connected to keyboard connectors 466 and 476. Each time a key on keypad 130 is pressed, an interrupt is triggered in controller 316. Hand held module 16 is capable of audio output using speaker 452 driven by transistors 448 and 450 under the control of controller 316.

Hand held module 16 includes circuitry to generate various power supply values. The +5 volt power supply is created using integrated circuit 408. The power source for integrated circuit 408 is a +12 volt power supply provided from power supply/interface 138 shown in FIG. 4. A −20 volt power supply is derived from the +5 volt power supply using integrated circuit 416.

Controller 316 is coupled to memory cartridge 128 through connector 400. Memory cartridge 128 provides information related to wheel alignment for various make and model year automobiles. Memory cartridge 128 also carries program instructions used by controller 316. Memory cartridge 128 is replaceable and may be updated for subsequent model years. Memory cartridge 128 includes a read only memory for storing the information.

Hand held module 16 is connected to head units 18L, 18R, 20L, and 20R by a serial data bus through connector 496. UART 460 is used for serial communication so that data and instructions may be exchanged between controller 316 and head units 18L, 18R, 20L, and 20R. Head units 18L, 18R, 20L, and 20R include microprocessors (not shown) for controlling head unit operation. The microprocessors in head units 18L, 18R, 20L, and 20R communicate with controller 316 through UART 460.

Liquid crystal display 134 is connected to the circuitry shown in FIGS. 5A through 5K through connector 398. Liquid crystal display contrast control circuitry 350 is used to control the contrast of liquid crystal display matrix 512 through contrast circuitry 518. Liquid crystal display contrast control circuitry 350 includes a digital-to-analog conversion integrated circuit 352 which converts an 8 bit word received on inputs DB0 through DB7 into a voltage level which is applied to OPAMP 354. The output of OPAMP 354 is applied to contrast circuitry 518.

Back light 516 in liquid crystal display module 134 is controlled by liquid crystal display back lighting control circuitry 390. Integrated circuit 392 receives a digital value on inputs DB0 through DB7 from the DATA bus. This input is converted into an analog value and applied to the base of transistor 394. In a preferred embodiment, back light 516 comprises a light emitting diode.

Liquid crystal display control 380 provides input for liquid crystal display driver 136. Three databits are used to control driver 136 using integrated circuit 388. Integrated circuit 388 is clocked using NOR gate 384. Clock signals are provided to driver 136 through invertor 382. A reset signal can be sent to interface 514 using inverter 382.

EPROM chip select circuit 370 is used to select memory chips in memory cartridge 128 which is connected to memory cartridge connector 400.

During operation, the present invention allows an operator to align the wheels of the vehicle without viewing display 134. Speaker 452 is used to audibly indicate the alignment of a wheel. For example, a first tone indicates that an adjustment has been made too far in a first direction, a second tone indicates that an adjustment has been made too far in a second direction while a third tone indicates that the adjustment is within a predetermined tolerance of the desired value. These tones may be of different frequencies or comprise a series of frequency pulses. In another embodiment, a short low-to-high tone will sound when an adjustment meter goes into specification range and a short high-to-low tone will sound when an adjustment meter goes out of specification range.

Figure 7:
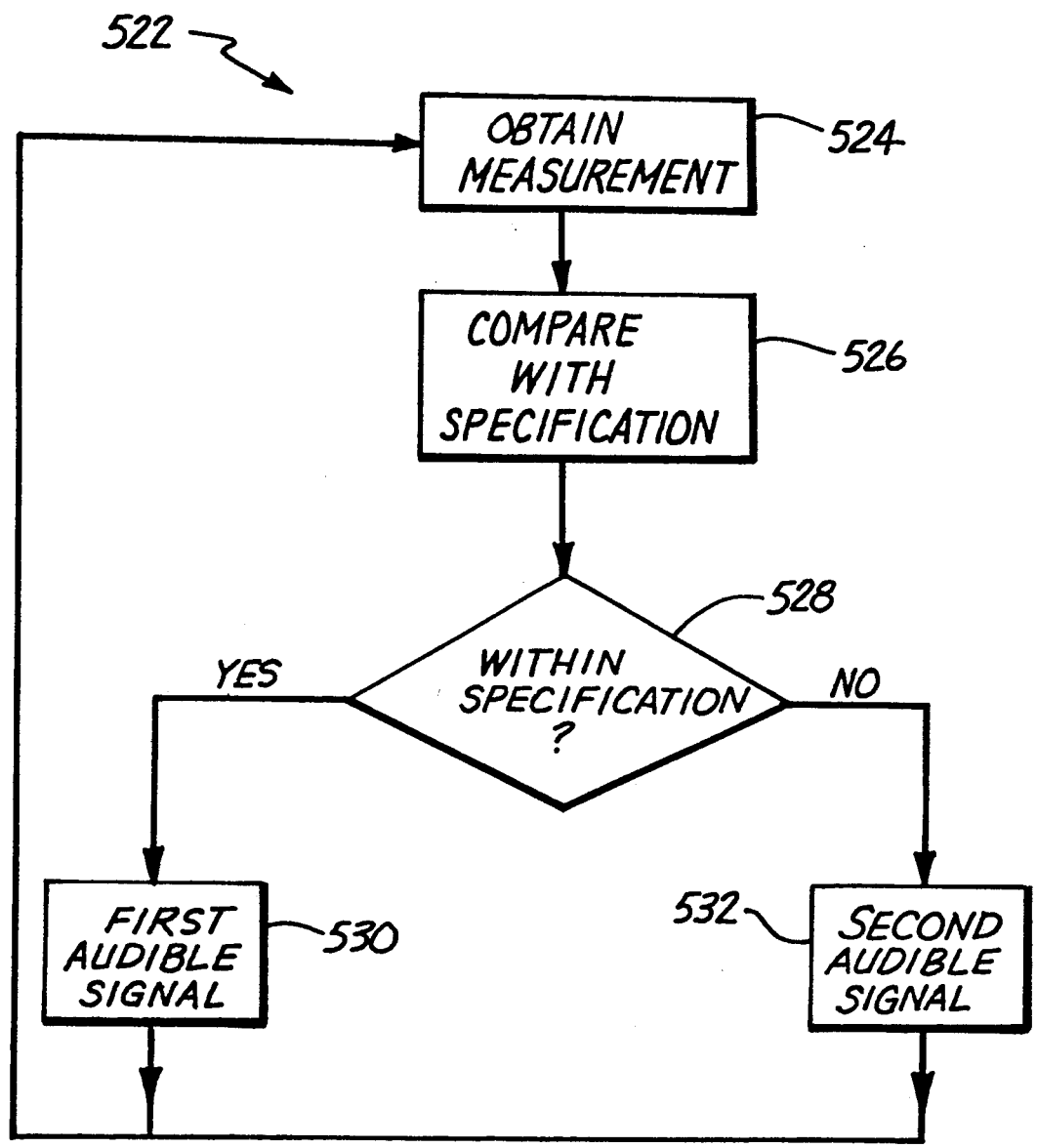
FIG. 7 shows a flow chart of a method for generating audible signals in accordance with the present invention.

FIG. 7 shows a flow chart 522 of the steps used to generate an audible tone in accordance with the present invention. The steps of flow chart 522 are performed by controller 316. At block 524, controller 316 obtains angle measurements for the wheels of the automotive vehicle and control is passed to block 526. At block 526, the measurement is compared with specified limits for the automotive vehicle under test and control is passed to block 528. At block 528, if the measured value is within specification, control is passed to block 530. If the measured value is not within specification, control is passed to block 532. At block 530, a first audible signal is provided which indicates that the measured value is within specification. At block 532, a second audible signal is provided which indicates that the measured value is not within specification. Both block 530 and block 532 return control to block 524 where subsequent measurements are obtained.

To further simplify operation, display 100 of hand held module 16 provides information in the form of icons to a system operator. These icons direct the operator through the steps of wheel alignment in an easy to read format. The icons are generated by controller 316.

The present invention may be powered using a car battery. Therefore, the alignment system is easily moved to remote locations. Furthermore, the present invention is suitable for aligning the wheels of a truck on-site, outside of a garage.

Although the present invention has been described with reference to preferred embodiments, workers skilled in the art will recognize that changes may be made in form and detail without departing from the spirit and scope of the invention.

What is claimed is:

1. An automotive vehicle wheel alignment system for aligning the four wheels of an automotive vehicle, comprising:

a left front head unit for coupling to a left front wheel of the automotive vehicle and providing an angle measurement output;

a right front head unit for coupling to a right front wheel of the automotive vehicle and providing an angle measurement output;

a left rear head unit for coupling to a left rear wheel of the automotive vehicle and providing an angle measurement output;

a right rear head unit for coupling to a right rear wheel of the automotive vehicle and providing an angle measurement output;

a communication/power bus coupled to the left front head unit, the right front head unit, the left rear head unit and the right rear head unit, the communication/power bus comprising:

left front coupling means for communicating information sent to the left front head unit, communicating information sent from the left front head unit, and carrying power to the left front head unit;

right front coupling means for communicating information sent to the right front head unit, communicating information sent from the right front head unit, and carrying power to the right front head unit;

left rear coupling means for communicating information sent to the left rear head unit, communicating information sent from the left rear head unit, and carrying power to the left rear head unit; and right rear coupling means for communicating information sent to the right rear head unit, communicating information sent from the right rear head unit, and carrying power to the right rear head unit;

hand held module coupling means for communicating information and carrying power; supply/interface means coupled to the communication/power bus for providing power to the left front head unit through the left front coupling means, for providing power to the right front head unit through the right front coupling means, for providing power to the left rear head unit through the left rear coupling means, for providing power to the right rear head unit through the right rear coupling means, for providing power to the hand held module coupling means, and for providing an interface between the left front coupling means, the right front coupling means, the left rear coupling means, the right rear coupling means and the hand held module coupling means, wherein the left front coupling means, the right front coupling means, the left rear coupling means, the right rear coupling means and the hand held module coupling means carry information and the supply/interface means transfers information between the hand held module coupling means and the left front coupling means, the right front coupling means, the left rear coupling means and the right rear coupling means;

a hand held module operably coupled through the hand held module coupling means, the supply/interface means and the communication/power bus to the left front head unit, the right front head unit, the left rear head unit, and the right rear head unit wherein the hand held module obtains wheel alignment measurements and provides alignment information to an operator, the hand held module comprising:

power receiving means for receiving power from the supply/interface means through the hand held module coupling means and providing a power output to power the hand held module;

communications means operably coupled to the head units through the hand held module coupling means, the supply/interface means and the communication/power bus for receiving angle measurements and providing an output;

memory means for storing computer program instructions;

input means for receiving an input from the operator;

a controller coupled to the communications means, the memory means and the input means for processing the output from the communications means based upon the input from the operator and computer program instructions in the memory means and providing a display data output related to an angular relationship of the wheels of the automotive vehicle; and a liquid crystal display coupled to the controller wherein the liquid crystal display includes an liquid crystal display matrix for forming an image based upon the display data output from the controller.

2. The automotive vehicle wheel alignment system of claim 1 including a liquid crystal display back light control means for controlling back lighting of the liquid crystal display.

3. The automotive vehicle wheel alignment system of claim 1 wherein the hand held module includes a housing having a plurality of buttons, the housing adapted for being held by an operator such that the buttons are operable.

4. The automotive vehicle wheel alignment system of claim 1 including a power supply/interface connected to the left front head unit, the right front head unit, the right rear head unit, and the hand held unit for providing power to the left front head unit, the right front head unit, the right rear head unit, and the hand held unit in the module and providing a communications path between the hand held module and the left front head unit, right front head unit, left rear head unit, and right rear head unit.

5. The automotive vehicle wheel alignment system of claim 1 including means for providing a first audible signal in response to a first relationship between a measured alignment angle of the automotive vehicle and a predetermined alignment angle specified for the automotive vehicle and for providing a second audible signal which is different from the first audible signal in response to a second relationship between the measured alignment angle of the automotive vehicle and the predetermined alignment angle specified for the automotive vehicle.

6. The automotive vehicle wheel alignment system of claim 1 wherein the hand held module includes a removable non-volatile memory cartridge for storing automotive vehicle wheel alignment specifications.

7. The automotive vehicle wheel alignment system of claim 1 including power down interrupt means for providing an interrupt to the controller upon detection of loss of power to the hand held module whereby information related to wheel alignment is stored in the memory means by the controller.

8. The automotive vehicle wheel alignment system of claim 1 wherein the hand held module includes contrast control means coupled to the liquid crystal display for providing a contrast signal to the liquid crystal display whereby contrast of the image formed by the liquid crystal display matrix is controlled by the contrast signal.

9. An automotive vehicle wheel alignment system for aligning wheels of an automotive vehicle, the system comprising:
measurement means for providing wheel alignment angle measurement outputs; and
a hand held module operably coupled to the measurement means for obtaining wheel alignment measurements and providing alignment information to an operator, the hand held module comprising:
communications means operably coupled to the measurement means for receiving angle measurements and providing an output;
a removable non-volatile memory cartridge for storing automotive vehicle wheel alignment specifications;
input means for receiving an input from the operator;
a controller coupled to the communications means, the input means, and the removable non-volatile memory cartridge for processing the output from the communications means based upon the input from the operator and based upon the automotive vehicle wheel alignment specifications in the non-volatile memory cartridge and providing a display data output related to an angular relationship of the wheels of the automotive vehicle; and
display means coupled to the controller for forming an image based upon the display data output from the controller.

10. The automotive vehicle wheel alignment system of claim 9 wherein the hand held module includes a housing having a plurality of buttons, the housing adapted for being held by an operator such that the buttons are operable.

11. The automotive vehicle wheel alignment system of claim 9 including a supply/interface means connected to the measurement means and the hand held module for providing a communication path between the module and the measurement means.

12. An automotive vehicle wheel alignment system for aligning wheels of an automotive vehicle, the system comprising:
measurement means for providing wheel alignment angle measurement outputs; and
a hand held module operably coupled to the measurement means for obtaining wheel alignment measurements and providing alignment information to an operator, the hand held module comprising:
communications means operably coupled to the measurement means for receiving angle measurements and providing an output;
memory means for storing information;
input means for receiving an input from the operator;
a controller coupled to the communications means, the memory means and the input means for processing the output from the communications means based upon the input from the operator and providing a display data output related to an angular relationship of the wheels of the automotive vehicle;
power down interrupt means for providing an interrupt to the controller upon detection of a loss of power to the module whereby information related to wheel alignment is stored in the memory means by the controller; and
display means coupled to the controller for forming an image based upon the display data output from the controller.

13. The automotive vehicle wheel alignment system of claim 12 wherein the hand held module includes a housing having a plurality of buttons, the housing adapted for being held by an operator such that the buttons are operable.

14. The automotive vehicle wheel alignment system of claim 12 including a power supply/interface connected to the measurement means and the hand held module and providing a communications path between the hand held module and the measurement means.

15. An automotive vehicle wheel alignment system for aligning wheels of an automotive vehicle, the system comprising:
a left front head unit for coupling to a left front wheel of the automotive vehicle and providing an angle measurement output;
a right front head unit for coupling to a right front wheel of the automotive vehicle and providing an angle measurement output;
a left rear head unit for coupling to a left rear wheel of the automotive vehicle and providing an angle measurement output;
a right rear head unit for coupling to a right rear wheel of the automotive vehicle and providing an angle measurement output; and
a hand held module operably coupled to the left front head unit, the right front head unit, the left rear head unit, and the right rear head unit for obtaining wheel alignment measurements and providing alignment information to an operator, the hand held module comprising:
communications means operably coupled to the head units for receiving angle measurements and providing an output;
memory means for storing computer program instructions;
input means for receiving an input from the operator;
display means for receiving information and producing display outputs dependent on the received information;
processor means for processing the output from the communications means based upon the input from the operator and upon computer program instructions in the memory means;
storage means for storing icons representative of operator steps to perform an alignment test;
means for receiving information from the input means related to an alignment test selected by the operator;

means for retrieving from the storage means icons which are related to a series of operator steps to perform the alignment test selected by the operator; and output means for providing retrieved icons to the display means, thereby directing the operator through the series of operator steps to perform the selected alignment test.

16. An automotive vehicle wheel alignment system for aligning the four wheels of an automotive vehicle, comprising:

a left front head unit for coupling to a left front wheel of the automotive vehicle and providing an angle measurement output;

a right front head unit for coupling to a right front wheel of the automotive vehicle and providing an angle measurement output;

a left rear head unit for coupling to a left rear wheel of the automotive vehicle and providing an angle measurement output; and a right rear head unit for coupling to a right rear wheel of the automotive vehicle and providing an angle measurement output;

a hand held module adapted to be held by an operator, the hand held module including:

angle input means for receiving the angle measurement outputs from the left front head unit, the right front head unit, the left rear head unit and the right rear head unit;

operator input means for receiving information input by the operator;

memory means for storing program instructions;

controller means for calculating alignment angles for the wheels of the automotive vehicle based upon the angle measurement outputs, stored program instructions and information input by the operator, and for providing an alignment angle output; and display means for displaying alignment angles for the wheels of the automotive vehicle based upon the alignment angle output.

17. The automotive vehicle wheel alignment system of claim 16 wherein the display means comprises a liquid crystal display.

18. The automotive vehicle wheel alignment system of claim 16 wherein the display means provides a graphical display.

19. The automotive vehicle wheel alignment system of claim 16 including a supply/interface means for providing a communication path between the hand held module and the left front head unit, the right front head unit, the left rear head unit and the right rear head unit.

20. A method of aligning wheels of an automotive vehicle, comprising:

mounting head units to wheels of the automotive vehicle;

obtaining wheel angle measurements from the head units;

providing wheel angle measurements to a portable hand held module;

receiving information input by an operator at the hand held module related to a selected alignment test to be performed on the automotive vehicle;

calculating alignment angles of the vehicle at the hand held module based upon wheel angle measurements and the selected alignment test; and prompting the operator through a series of steps for the selected alignment test based upon the calculated alignment angles by displaying information on a display carried in the hand held module to guide alignment of wheels of the automotive vehicle by the operator based upon prompts displayed on the display of the hand held module.

21. A method of aligning wheels of an automotive vehicle, comprising:

mounting head units to wheels of the automotive vehicle;

obtaining wheel angle measurements from the head units;

providing wheel angle measurements to a portable hand held module;

receiving information input into the hand held module by an operator related to a make and model of automotive vehicle;

receiving information input into the hand held module by the operator related to a selected alignment test to be performed on the automotive vehicle;

calculating alignment angles of the vehicle at the hand held module based upon wheel angle measurements and the selected alignment test;

retrieving alignment specifications for the make and model of automotive vehicle which are stored in the hand held module;

generating prompt information based upon the selected test and the calculated alignment angles with prompts stored in the hand held module to prompt the operator through a series of steps to align wheels of the automotive vehicle;

displaying the prompt information on a display carried in the hand held module; and positioning the hand held module at a desired location to facilitate aligning wheels of the automotive vehicle to guide alignment of wheels of the automotive vehicle by the operator based upon prompts displayed on the display of the hand held module.

* * * * *

UNITED STATES PATENT AND TRADEMARK OFFICE
CERTIFICATE OF CORRECTION

PATENT NO. : 5,313,711
DATED : May 24, 1994
INVENTOR(S) : Kling, III et al

It is certified that error appears in the above-indentified patent and that said Letters Patent is hereby corrected as shown below:

Col. 1, line 43, after "automobile", insert --.--

Col. 9, lines 47-48, after "carrying power;", there should be a paragraph break starting with --supply/interface--

Signed and Sealed this

Thirteenth Day of September, 1994

Attest:

BRUCE LEHMAN

Attesting Officer

Commissioner of Patents and Trademarks